United States Patent [19]

Ogden

[11] 4,399,744
[45] * Aug. 23, 1983

[54] BEVERAGE CARBONATOR DEVICE

[76] Inventor: Ralph Ogden, 1304 Fisher St., Munster, Ind. 46321

[*] Notice: The portion of the term of this patent subsequent to Sep. 7, 1999 has been disclaimed.

[21] Appl. No.: 303,156

[22] Filed: Sep. 17, 1981

Related U.S. Application Data

[63] Continuation-in-part of Ser. No. 251,476, Apr. 6, 1981, Pat. No. 4,347,783.

[51] Int. Cl.³ .................................................. B01F 3/04
[52] U.S. Cl. .................................. 99/323.1; 99/323.2; 261/DIG. 7; 261/DIG. 27
[58] Field of Search .......................... 99/323.1, 323.2; 261/DIG. 7, DIG. 27, 124

[56] References Cited

U.S. PATENT DOCUMENTS

| | | | |
|---|---|---|---|
| 1,712,701 | 5/1929 | Hassensall | 261/DIG. 7 |
| 1,713,787 | 5/1929 | Stinson et al. | 261/DIG. 7 |
| 1,905,986 | 4/1933 | Jacobs et al. | |
| 2,600,901 | 6/1952 | Meldau | 261/121 |
| 3,480,493 | 11/1969 | Hovey | 23/282 |
| 4,040,342 | 8/1977 | Austin et al. | 99/323.1 |

Primary Examiner—Harvey C. Hornsby
Assistant Examiner—Christine A. Peterson
Attorney, Agent, or Firm—McWilliams, Mann, Zummer & Sweeney

[57] ABSTRACT

A beverage carbonator device comprising an outer main container for holding the beverage as it is being, and/or after it is, carbonated, which is open at its upper end and has a beverage dispensing off-on control valve or spigot at its lower end, and a carbonation generating and pressure regulating assembly arranged for mounting within the container in sealed application to the container open end. The assembly in one form includes a lower carbonating gas generating tank that is to receive and contain the carbonating gas generating substances, which tank is removably connected in sealed relation to an orificed floor of a carbonating gas receiver that is closed at its upper end by a flexible diaphragm, with the receiver in turn being secured to a cover that is part of the assembly and that is sealingly applied to the container upper end.

10 Claims, 9 Drawing Figures

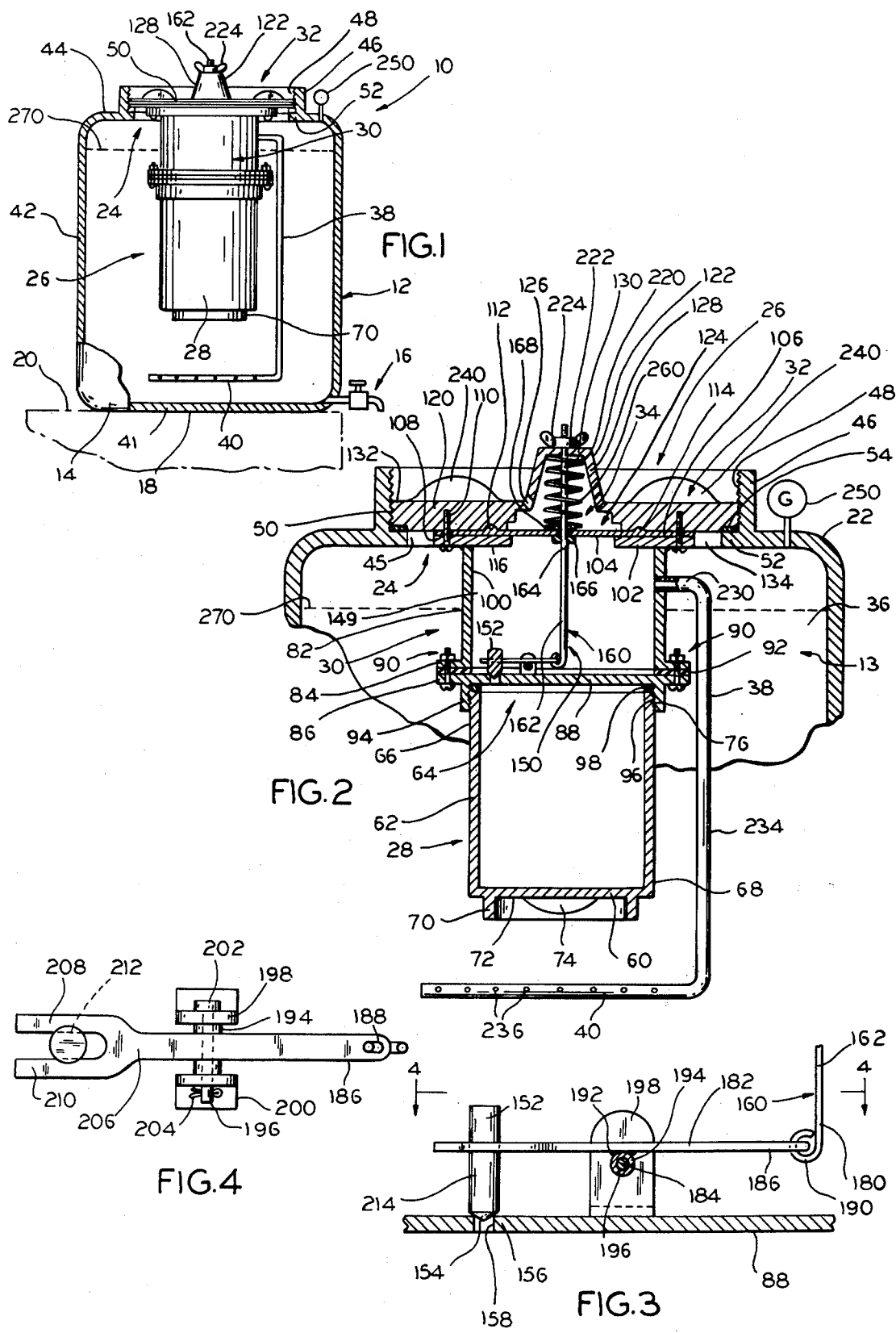

BEVERAGE CARBONATOR DEVICE

This application is a continuation-in-part of my application Ser. No. 251,476, filed Apr. 6, 1981, now U.S. Pat. No. 4,347,783, granted Sept. 7, 1982.

This device relates to a device for carbonating beverages, and for maintaining the carbonation in beverages, and more particularly, to a device of this type especially adapted for home use.

Carbonated beverages are widely consumed, and a number of companies are profitably engaged in merchandising the various brands of canned and bottled products of this type. These beverages sell for a relatively high price considering that the product is mostly carbonated water that includes flavoring and sugar. The cost of canning or bottling and packaging the various products involved and transporting them to the place of sale is considerable, to which must be added, insofar as the consumer is concerned, the cost and time and money to acquire the product containers involved and transfer them to the consumer's home or other place where the contents will be consumed. On top of that is the problem of disposing of the empty containers, either by way of return, if deposit on return is involved, or by way of proper trash disposal where the container is disposable. Where the container is of the disposable type, its cost is frequently greater than the cost of the beverage it contains.

The preparation of carbonated water is simply and easily performed. All that is required is the water, sugar, yeast, and a closed container to force the evolving carbon dioxide into solution. At one time it was popular for the consumer to make root beer and other carbonated beverages, which became known colloquially as "home brew". For making root beer, required was the root beer extract, yeast, sugar, and the necessary bottles into which both the beverage to be consumed and the fermenting substances were placed in suitable formulation, after which the bottles were capped. After a few days at room temperature, the carbon dioxide evolving from the action of the yeast on the sugar would have effected carbonation of the bottled beverage.

A major disadvantage of this method is that the yeast remains in the beverage, and thus continues to produce carbon dioxide and alcohol as well, thereby depleting the sugar. Thus, the precise controlling of the carbonation was very difficult and it was found to be necessary to consume the beverage as soon as the amount of carbon dioxide necessary for the desired taste had been formed. Even so, as the yeast remained in the beverage, it added an unpleasant taste to the beverage, and tended to create digestive discomforts in many people. Further, the presence of the yeast in the beverage left a milky appearance which was not pleasant to look at.

Of course, continued fermentation of the beverage components in the bottles continued to lead to pressure build ups that could and sometimes did result in explosion of the bottle.

The popularity and desirability of carbonated beverages have induced numerous efforts to devise beverage carbonating devices that will permit home carbonation of the beverages by the consumer without these accompanying difficulties. One major problem that has plagued the successful development of this type of device, from a practical standpoint, is insuring that only the carbonating gas reaches the beverage to be carbonated since, as indicated, the yeast, if it gets into the beverage, adversely affects the quality and potability of the beverage.

Another problem that has been encountered in connection with the development of devices of this type is that as the beverage is withdrawn from the device, typically under the pressure of its dissolved carbon dioxide, the carbonation of, and the resulting pressure on, the beverage remaining in the device decreases with each withdrawal, with the result that the final amounts withdrawn may well be and frequently are "flat" or devoid or carbonation. This problem also is found in connection with the familiar half keg of beer commonly offered to consumers for picnics and other similar occasions. A half keg of beer will have fifteen and one-half gallons of beer, held in carbonation under about fifteen psig., and for dispensing purposes. Where a substantial portion of the beer remains undispensed and it is desired to store it refrigerated for later use, the keg needs to be connected to an external source of carbon dioxide under pressure during storage. Conventional devices of this type tend to leak, with the result that the beer goes flat while being stored and is not really suitable for consumption.

Breweries are known to have on hand an over supply of carbon dioxide, due to the quantities of this gas that are generated in the process of making beer. This excess carbon dioxide finds some use for pressurizing the beer and moving the beer around the facility, but much excess carbon dioxide remains for other use.

A principal object of the present invention is to provide a beverage carbonator device especially suited for home use that combines the gas generation and all the materials involved in connection with the gas generation to a chamber that is isolated from the beverage, with only the gas generated being supplied to the beverage, and in a controlled manner, so as to maintain any and all of the beverage remaining to be dispensed, from a particular beverage batch made up, under a predetermined carbonating pressure that insures that the last of the beverage as drawn from the device will be just as potable as the first.

Another principal object of the invention is to provide a beverage carbonator device especially suited for consumer use that includes an outer main container or vessel in which the beverage to be carbonated is contained and retained for dispensing purposes, and a separate carbonation generation and pressure regulating assembly that is removably mounted in the main vessel or container, and that in use is disposed therein, which includes a removable tank to which the gas generating materials are applied, and in which same are retained while a particular beverage charge or batch is held available for dispensing, and which provides for automatic regulating of the carbonating gas for supply of same to the beverage so as to maintain the beverage under substantially uniform carbonating pressure conditions so long as any part of the beverage remains to be dispensed.

Yet another principal object of the invention is to provide beverage carbonator device especially suited for consumer use that includes an outer main container or vessel in which the beverage to be carbonated is contained and retained for dispensing purposes, and a separate carbonation and pressure regulating assembly that is removably mounted in the main vessel or container, and that in use is disposed therein, which includes a sealed vessel forming tank that is pre-charged with carbon dioxide, and which provides for automatic regulating of the carbonating gas for supply of same from the tank to the beverage so as to both carbonate the beverage, and maintain the beverage under substantially uniform carbonating pressure conditions so long as any part of the beverage remains to be dispensed, without requiring connection to external sources of carbon dioxide after charging of the tank.

A further principal object of the invention is to provide a beverage carbonating device especially adapted for home use that is adapted to use both the fermentation or chemical reaction methods of generating the carbonating carbon dioxide, and with equal facility.

Still a further principal object of the invention is to provide a carbonating device especially suited for use with beer, which provides for use of the excess carbon dioxide gas available at breweries to charge one half keg size beer containers in such a manner as to carbonate the beer, provide the dispensing pressure on the beer, and hold the beer under substantially uniform carbonating conditions, while the beer is awaiting consumption, until the beer of the container is fully dispensed.

Another important object of the invention is to provide a beverage carbonating device especially adapted for home use that is composed of few and simple parts, that is economical to manufacture, and that is convenient and reliable in use.

In accordance with the invention, a beverage carbonator device especially suited for home use is provided comprising an outer main container for holding the beverage to be carbonated, and for dispensing the beverage after it is carbonated, which container is open at its upper end for receiving a special carbonating carbon dioxide gas generating and pressure regulating assembly, which assembly is applied in sealed relation to the container with the basic assembly components disposed therein. The carbonation generating and pressure regulating assembly comprises a lower carbonating gas generating tank that is to receive and contain the carbonating gas generating substances, on which is superimposed a carbonating gas receiver. The receiver is essentially a closed drum like structure having a floor formed with an orifice, with the tank being removably connected in sealed relation to the receiver below its floor. At its upper end the receiver is closed by a flexible diaphragm, with the receiver upper end being secured to a cover for the container that in turn is sealingly applied to the container, with the tank and much of the receiver immersed in the beverage to be carbonated. The receiver has connected thereto a carbon dioxide conducting conduit that has a discharge end which is disposed underneath the tank and spaced therefrom and is formed for appropriate injection of the gas into the beverage.

The receiver diaphragm is exposed to a vented breathing chamber it defines with the cover and the diaphragm is spring biased inwardly of the receiver and carries a link that is operatively connected to a valve member that cooperates with the receiver floor orifice, for controlling the venting of the carbon dioxide gas from the tank to the receiver, and thus the carbonating of the beverage, in accordance with the objects of the invention.

The arrangement of the receiver diaphragm, valve member, and the means for articulating the diaphragm to the valve member for controlling the passage of the gas from the tank to the receiver are such that the pressure of the carbonating carbon dioxide gas in the container for beverage carbonating purposes is maintained at a predetermined level for insuring that the carbonation of the beverage remains the same within the container until it is totally dispensed.

Further, the arrangement is such that only the carbonating carbon dioxide gas reaches the beverage to be carbonated, with the gas generating substances being held totally isolated from the beverage both while the initial carbonating procedures are being effected, and as long as any part of the beverage remains in the container for dispensing purposes.

In accordance with another form of the invention, a beverage carbonator device especially suited for carbonating beer in the popular one half keg size quantity at the brewery is provided, with the carbonator device being arranged for home storage and use of the beer under carbonating conditions that maintains the beer under appropriate carbonating pressures until fully dispensed, comprising an outer main container for holding the beer to be carbonated from which it is to be dispensed by the consumer, which container is open at its upper end for receiving a special carbonating carbon dioxide charge receiving and pressure regulating assembly, which assembly is applied in sealed relation to the container with the basic assembly components disposed therein. The carbonating gas charge holding and pressure regulating assembly comprises a lower carbonating sealed vessel forming a tank that is to receive and contain a suitable charge of fluid carbon dioxide, preferably in its liquid state, on which vessel is superimposed a carbonating gas receiver. The receiver of this embodiment is also essentially a closed drum like structure having a floor that closes the vessel to form the tank, which floor is formed with an orifice, with the tank being connected in sealed relation to the receiver below its floor. At its upper end the receiver is closed by a flexible diaphragm, with the receiver upper end being secured to a cover for the container that in turn is sealingly applied to the container, with the tank and much of the receiver immersed, in use, in the beverage to be carbonated. The receiver has connected thereto a carbon dioxide conducting conduit that has a discharge end which is disposed for application of the carbonating gas to the beverage, namely, carbon dioxide.

The receiver diaphragm, as in the first described embodiment, is exposed to a vented breathing chamber it defines with the cover and the diaphragm is spring biased inwardly of the receiver and carries a link that is operatively connected to a valve member that cooperates with the receiver floor orifice, for controlling the venting of the carbon dioxide gas from the tank to the receiver, and thus the carbonating of the beverage, in accordance with the objects of the invention.

In use, the beer containing and dispensing embodiment has its tank charged with fluid carbon dioxide (in its liquid state) and its main container suitably filled with beer, as at the brewery, where the carbon dioxide charge holding and pressure regulating assembly, after sealed application to the main container, may be operated to carbonate the beer and hold it under a suitable carbonating pressure for awaiting consumer use. Consumer use may be in the same manner as the gas generating embodiment though a conventional beer keg tapping arrangement can be used for this embodiment, and when partial dispensing has been effected, the remainder of the beverage may be stored under carbonating maintaining conditions relying on the tank carbon dioxide charge, and without requiring connection to external sources of carbon dioxide.

Other objects, uses, and advantages will become obvious or apparent from a consideration of the following detailed description and the application drawings.

In the drawings:

FIG. 1 is a diagrammatic side elevational view illustrating the carbonating gas generating embodiment of the invention, with the beverage container itself shown largely in section to better illustrate in elevation the carbonation gas generating and pressure regulating assembly as part of the basic device of this invention, and that in FIG. 1 is shown in its operating position;

FIG. 2 is a fragmental view similar to that of FIG. 1, but showing only the upper fragment of the beverage container and with the carbonating gas and pressure regulating assembly shown in section;

FIG. 3 is a fragmental view showing on an enlarged scale the cooperating valve member and receiver floor orifice that are shown in FIG. 2;

FIG. 4 is a fragmental plan view taken substantially along line 4—4 of FIG. 3;

Figures 5, 7:
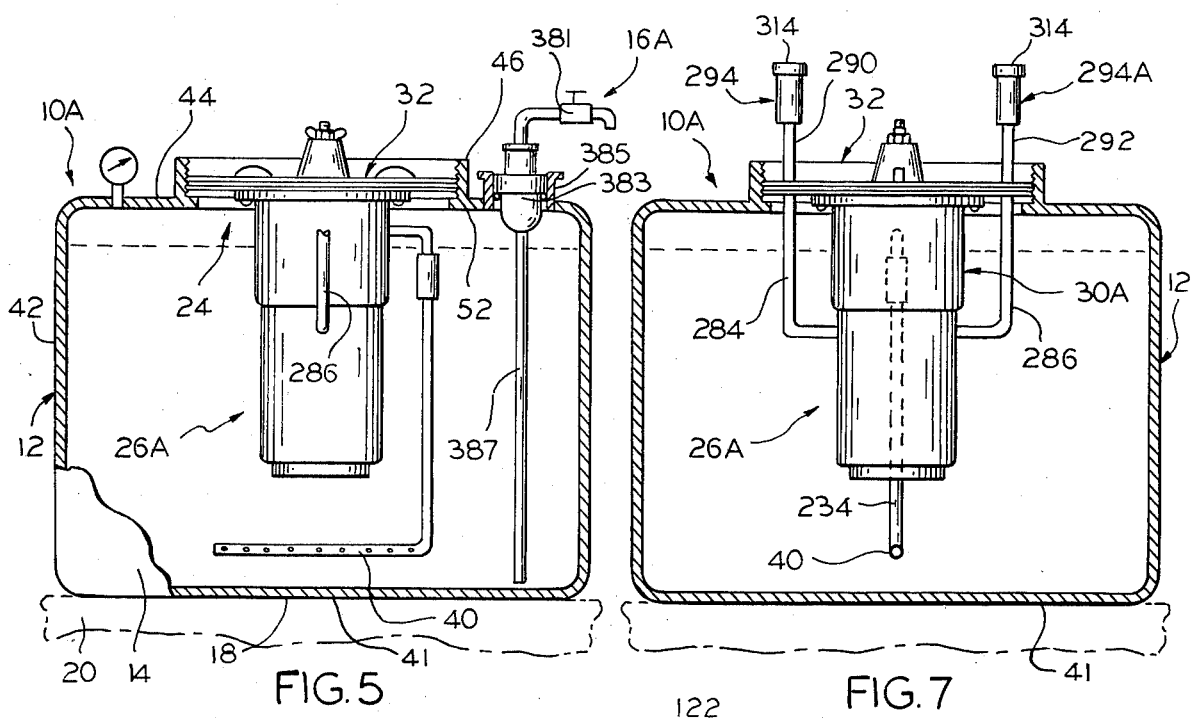
FIGS. 5 and 6 are views similar to those of FIGS. 1 and 2, respectively, illustrating the carbon dioxide charge receiving and storing embodiment of the invention that is advantageously used in connection with the merchandising of beer.
FIG. 7 is a view similar to that of FIG. 5, but taken from the left hand side of FIG. 5.

However, it is to be distinctly understood that the specific drawing illustrations provided are supplied primarily to comply with the requirements of the Patent Laws, and that the invention is susceptible of variations and modifications that will be obvious to those skilled in the art, and which are intended to be covered by the appended claims.

GENERAL DESCRIPTION

Referring first to FIGS. 1-4, reference numeral 10 generally indicates one form of the beverage carbonator device as a whole, which comprises beverage containing and dispensing container or vessel 12 that is equipped at its lower end 14 with a suitable dispensing off-on control valve or spigot 16 that may be of any suitable conventional type. Container 12 at its lower end 14 defines flat bottom portion or floor 18 that, in use of the device 10, may rest on top of a suitable table or counter indicated at 20.

The container 12 at its upper end 22 is open as indicated at 24 to receive in sealed relation to the container the carbonating gas generating and pressure regulating assembly 26 which comprises a receptacle or tank 28 in which the carbonating gas generating substances are to be received, which is removably connected in sealed relation to carbonating gas receiver or drum 30 that is in turn secured to the special container cover 32 that is to be applied to the container 12 in sealed relation thereto.

Operatively associated with the receiver 30 and cover 32 is a pressure regulating device 34 (see FIG. 2) that functions to control the supply of the carbonating gas that is to be supplied to the beverage 36 and container 22, from receiver 30 through conduit 38 that in the form illustrated includes gas discharge portion 40, that in the assembled relation of the device 10 is to be disposed adjacent the lower portion 14 of container 12. The tank 28, in accordance with the invention, in addition to serving as the gas generator, also serves as a gas accumulator, with the release of the accumulated gas in tank 28 to the beverage being controlled by regulating device 34.

As will be clear from the specific disclosure that follows hereinafter, the pressure regulator device 34 functions to control the supply of the carbonating gas to the carbonating chamber 13 (that is defined by the container 12) for initial carbonating purposes, and also so that it is restored to and maintained at a substantially uniform predetermined pressure level as needed, so long as any of the beverage 36 remains in the container 22 for dispensing purposes. Thus, the device 10 functions to insure that the final amount of the beverage 36 that is withdrawn from the container 12 will be of the same potable carbonated quality as the first amounts of the beverage that are in dispense of the container 22 after carbonating of the beverage 36 has been completed.

Referring to FIGS. 5-10, reference numeral 10A generally indicates the modified beverage carbonator device as a whole, which again comprises beverage containing and dispensing container of vessel 12 that may be equipped at its lower end 14 with the off-on control valve or spigot 16 of FIGS. 1-4, but which is preferably equipped with conventional tapping arrangement 16A that is of a type commonly used for tapping beer kegs. Container 12 at its lower end 14 again defines flat bottom portion or floor 18 that, in use of the device 10A, may rest on top of a suitable table or counter indicated at 20.

The container 12 of device 10A as illustrated is essentially the same as in device 10, and thus, at its upper end 22 is open as indicated at 24 to receive in sealed relation to the container 12 the carbonating gas charge receiving and pressure regulating assembly 26A which comprises a receptacle or vessel 27 in which a charge of carbon dioxide is to be received, which is connected in sealed relation to carbonating gas receiver or drum 30A for forming charge retaining tank 28A. Drum or receiver 30A is in turn secured to the special container cover 32 that is to be applied to the container 12 in sealed relation thereto.

Operatively associated with the receiver 30A and cover 32 is the pressure regulating device 34 of FIGS. 2-4 that functions, in the same manner as device 10, to control the supply of the carbonating gas that is to be supplied to the beverage 36 and container 12, from receiver 30A through conduit 38 that in the form illustrated may include gas discharge portion 40, that in the assembled relation of the device 10 is to be disposed adjacent the lower portion 14 of container 12. The tank 28A, in accordance with this embodiment of the invention serves as the container for the gas charge applied thereto, with the release of the gas from tank 28A to the beverage being controlled by regulating device 34.

As in the case of device 10, the pressure regulator device 34 functions to control the supply of the carbonating gas to the carbonating chamber 13 (that is defined by the container 12) for initial carbonating purposes, and also so that it is restored to and maintained at a substantially uniform predetermined pressure level as needed, so long as any of the beverage 36 remains in the container 12 for dispensing purposes. Thus, the device 10A functions to insure that the final amount of the beverage 36 that is withdrawn from the container 12 will be of the same potable carbonated quality as the first amounts of the beverage dispensed from the container 12 after carbonating of the beverage 36 has been completed.

SPECIFIC DESCRIPTION

The container 12, for both devices 10 and 10A, may be of any suitable type or configuration adapted to receive a beverage 36 to be carbonated for home or other consumer use, as, for instance, in fast food facilities or the like.

The container 12 is preferably formed from a suitable metallic or polymeric material that provides adequate safety factors for containing the internal pressures as to be subjected to by the beverage carbonating objectives of the invention. In the form illustrated, container 12 is essentially cylindrical in configuration defining bottom wall 41 that forms the container bottom 18, circumambient side wall 42, and top wall 44 that is shaped to define aperture 45 that forms opening 24. While the specifics of the container 12 may be of any suitable type from an engineering fabrication and manufacturing standpoint, in accordance with the invention the arrangement is to be such that the cover 32 is to be applied to the container opening 24 in seal tight relation thereto. For this purpose, in the form illustrated, the container is equipped with an upstanding annular flange 46 internally threaded as at 48 for cooperation with corresponding external threading 50 of the cover 32 for securing the cover 32 to the container. The positioning of the flange 46 relative to the container opening 24 forms a circumambient ledge portion 52 on which suitable seal 54 is applied for purposes of creating the necessary fluid tight seal between cover 32 and container 12.

Referring now to the carbonating gas generating and pressure regulating assemblly 26 of FIGS. 1-4, the receptacle or tank 28 comprises bottom wall 60 that is integral with up-standing circumambient side wall 62 that is open as at 64 at the tank upper end 66. The tank 28 at its lower end 68 may be formed with depending annular flange 70 to serve as a pedestal for the tank 28 on which it may be rested, as by being placed on table 20, when it is being loaded or charged with the gas generating substance. In the particular form shown, the underside 72 of the tank bottom 60 is formed with planar protuberance 74 that in practice would be centrally located on the axial center of the tank 28 to serve as a handle for turning same relative to receiver 30 for threaded connection thereto, the tank side wall 62 being externally threaded as indicated at 76 for this purpose.

The receiver or drum 30 generally comprises circumambient side wall 82 that in the form illustrated is externally flanged as indicated at 84 for connection to the corresponding flange 86 of the receiver floor or base plate 88. In the specific form illustrated, the receiver floor or base plate 88 is secured to the receiver flanging 84 by employing suitable nut and bolt devices 90, with suitable seal 92 being interposed therebetween.

The receiver floor base plate 88 is formed with depending securement flange 94 that is internally threaded as at 96 for threaded connection with the external threading 76 of the tank side wall 62. As indicated in FIG. 2, for sealing purposes, the tank 28 is turned up against the receiver floor base plate 86 with suitable O ring seal or the like 98 being interposed therebetween for sealing this connection against fluid leakage from or into the beverage 36.

The receiver 30 at its upper end 100 has affixed thereto, as by employing welding or the like, an annular disc 102 on top of which is applied flexible elastomeric diaphragm 104 of the pressure regulating device 34, with the outer margin 106 of the diaphragm being clamped between the disc 102 and the cover 32, as by securing the outer margin 108 of the disc 102 to the cover by employing suitable securing bolts or screws 110 at suitably located spaced apart points about the margin 108 of disc 102. Diaphragm 104 in the form illustrated is formed with suitable annular sealing ridge 112 that is seated in annular recess 114 of the cover for sealing purposes, the inner margin 116 of the disc 104 underlying the corresponding portion of the diapharagm for bracing purposes, in the illustrated embodiment.

The cover 32 for both devices 10 and 10A comprises a rounded plate member 120 of generally disc like configuration having an upstanding centrally located, upstanding protuberance 122 that defines with diaphragm 104 breathing chamber 124 that is vented to the ambient air through one or more suitable apertures 126. In the specific form shown, the protuberance 122 comprises upstanding side wall 128 that is of frusto conical configuration and terminates in a planar top wall 130 that serves an important function with the pressure regulating device 34, as will be described hereinafter. Cover forming member 120 has its perimeter portion 132 suitably formed to define the indicated threading 50 for cooperation with the vessel threading 48. The underside 134 of the cover forming member 120 is planar or flat for good clamping cooperation against the diaphragm 104, except for its annular groove 114 that cooperates with the sealing ridge 112 of the diaphragm. Receiver 30 defines pressure cavity 149.

The pressure regulating device 34 comprises in addition to the diaphragm 104 a valve device 150 that comprises valve member 152 having a valve head 154 (see FIG. 3) of suitable contour to cooperate with a valve seat 156 formed about a carbonating gas passing orifice 158 that is formed in the receiver floor 88 to pass the carbonating gas being formed and accumulated in tank 28 into the receiver 30. The valve member 152, in accordance with the invention, is operated by diaphragm 104 through link 160 that is in the form of an elongate rod 162 that is locked in alignment with the central axis of diaphragm 104 and that extends therethrough; for purposes of securing the rod 162 to the diaphragm 104, the rod 162 is suitably threaded as at 164 for threaded application on either side of diaphragm 104 of the respective nuts 166 and 168 which are turned against the diaphragm 104 for sealed connection of the rod member 162 thereto when the rod member 162 is properly positioned relative to diaphragm 104. For this purpose, suitable washers (not shown) may be interposed between the respective nuts 166 and 168 and the corresponding sides of diaphragm 104.

The rod 162 at its lower end 180 is pivotally connected to suitable lever member 182 that is pivotally mounted on the receiver floor 88 for fulcruming around axis 184, with the lever member 182 having a suitable connection to the valve member 152. In the form shown, lever member 182 is of flat or plate configuration defining at one end 186 of same a suitable aperture 188 to receiver the looped end 190 of rod member 162 for pivotal connection purposes. Member 182 has suitably fixed to the underside of same, as by welding or brazing at 192, suitable sleeve 194 that is pivotally mounted on pivot pin 196 that is suitably mounted between two spaced apart brackets 198 and 200 that are in turn suitably secured or made fast to the receiver floor 88, as by employing welding or the like. In the form shown, the brackets 198 and 200 are illustrated as being of the angle type, and pin 196 is headed as at 202 at one end of same and receives suitable fastener 204 at the other end of same to hold the pin in mounted relation.

The lever member 182 at its end 206 is bifurcated to define a pair of spaced apart arms 208 and 210 that are slidably received in slot 212 formed in the side wall 214 of the valve member 152 for purposes of keying the lever member 182 to valve member 152. When the valve member 152 is applied to lever member 182 is suitably centered relative to orifice 158, the valve member 152 may be suitably bonded to the lever member 182, as by employing a suitable adhesive, brazing, or the like.

Rod member 162 at its upper end 220 projects through aperture 222 formed in the protuberance top wall 130 for threaded connection to wing nut 224 for purposes that will hereinafter be made plain.

Receiver 30 has connected to its side wall 82 one end 230 of the conduit 38 which is formed to have a rectilinear portion 234 of same extend axially of the assembly 26, or downwardly of the device 10 in its assembled relation, which merges into the lower portion 40 that is angled at right angles to the rectilinear portion 234, and that is formed with gas emitting orifices 236 of a suitable configuration and shaping for defusing the gas generated by the device 10 into the beverage 36. The lower portion 40 may be of rectilinear or annular configuration, as desired, but preferably lies in a plane that substantially parallels that of base plate 88.

The cover 32 may be formed with suitable diametrically opposed upstanding planar protuberances 240 for serving as handles to turn to cover 32 to its closed relation relative to container 12, and vice versa.

The cover 12 may be equipped with a suitable pressure gauge 250 that is suitably mounted in the container 12, and preferably at its top wall 44 for a direct reading of the carbonating or carbonation maintaining pressure within container 12 when it is in use.

Interposed between the diaphragm 104 and the protuberance wall 130 is suitable helical compression spring 260 for biasing the diaphragm downwardly of the cover 26, which direction would thus tend to move the valve device 150 to its open position.

The pressure regulating device 34 and its valve device 150 are to be proportioned and arranged so that, unless the biasing action of spring 260 is overcome, when the carbonating carbon dioxide gas is generated in tank 28, the regulating device 34 will maintain orifice 158 open until the pressure in the chamber 13 reaches the desired predetermined pressure level, at which point the corresponding pressure in the receiver 82 will sufficiently deflect diaphragm 104 against the action of biasing spring 260 to cause device 34 to close the orifice 158.

However, even with the orifice 158 closed, generation of the carbon dioxide carbonating gas will continue within tank 28, and thus it accumulates in tank 28 until again needed in the container 12. On each withdrawal of the carbonated beverage 36 from the container 12, the pressure within the container 12 is of course reduced, which will involve the pressure regulating device 34 functioning, by reason of the correspondingly reduced pressure within the receiver 30, to move rod member 162 downwardly to an open orifice 158, under the biasing action provided by spring 260. When the pressure again has built up to the desired level within the chamber 36, the pressure in receiver 30 will have built up a corresponding amount, to the extent that diaphragm 104 is moved upwardly sufficiently against the biasing action of spring 260, whereby regulating device 34 then closes the valve device 150.

In assembling the assembly 26, and specifically, receiver 30 and cover 32, the receiver floor or base plate 88 first has valve device 150 applied thereto including rod 162, after which base plate 88 and seal 92 are made fast to the flange 84 of the receiver 30. Assuming annular plate 102 has been made fast to receiver side wall 82, diaphragm 104 has rod 162 applied thereto in the manner indicated, with nuts 166 and 168 being adjusted as needed for proper orientation of valve device 150. The plate 102, diaphragm 104 and cover are then assembled in the manner indicated, with rod 162 receiving spring 260 and extending through protuberance 122 for reception of nut 224. Conduit 38 is applied to receiver 30 at any convenient point in its assembly.

In use, the assembly 26 of device 10 is separated from the container 12, and the container 12 is filled with the beverage to be carbonated. While the amount of the beverage 36 to be so applied to the container 12 is, or course, optional, it is suggested that the amount be such that when the device 10 is assembled in its operating relation, the beverage level will be approximately as indicated at 270.

The tank 28 is disconnected from the receiver 30 and sat in an upright position on the table or counter 20 or the like, adjacent container 12, and has applied to same the carbon dioxide gas generating substances that may be employed.

Where the fermentation carbon dioxide gas generation type method is to be employed, the tank 28 has applied to same a suitable quantity of an aqueous solution of a suitable sugar, into which is applied yeast; the yeast is preferably contained in a packet formed by suitable membrane materials similar to the manner in which tea leaves are packaged in a tea bag whereby the liquids have gradual access to the yeast through the pores of the membrane and the resulting gas leaves the packet through the membrane pores for serving as the carbonation gas in accordance with the invention.

Alternately, the carbonating substances applied to tank 28 may be of the type used for chemical generation of carbon dioxide and may be, for instance, citric acid in tablet or dry form and sodium bicarbonate or the like mixed therewith, which may be packaged together in a manner similar to that suggested for the yeast, to which is applied a suitable charge of water.

In any event, when the charging or loading of tank 28 is complete, the tank 28 is made fast to receiver 30, as by being turned into secured sealing relation with respect to same, as suggested in FIG. 2. To conserve the carbon dioxide gas that is being generated, wing nut 224 is turned to draw rod member 162 upwardly to set valve member 152 in firm closed relation with the orifice 158.

The assembly 28 in then applied to the container 12, as by inserting the depending conduit 38, the tank 28, and the receiver 30 into the container through its opening 24 and then turning the cover 32 to seat same in sealed leak free relation with the seal 54. The wing nut 224 is then turned relative to rod member 162 to shift the rod member 160 downwardly so as to dispose the valve member 152 in its open relation with regard to the orifice 158, and at the position relative to receiver floor 88 that will permit the regulating device 34 to close the valve device 150 when the carbonating pressure in the chamber 13 reaches the desired level as indicated by the gauge 250.

With the valve device 150 in its open position, the carbon dioxide gas generated in tank 28 passes through orifice 158 into the receiver pressure cavity 149, and as the pressure from the gas within receiver 30 builds up, the gas passes from pressure cavity 149 into and through conduit 38 for emission into the beverage 36 in carbonating relation thereto. As indicated, when the pressure of the carbonating gas within the container 12, and exteriorly of the assembly 26, builds up to the desired level as indicated by gauge 250, diaphragm 104 in flexing outwardly of receiver 130 in response to the corresponding pressure levels within the receiver pressure cavity actuates the valve device 150 to close the orifice 158 by seating valve member valve end 154 against valve seat 156.

When one desires to have a drink of the beverage 36 that has been carbonated, he actuates the valve or spigot 16 to open same, and the beverage discharges from the valve or spigot 16, under the carbonating pressure in chamber 13, into a suitable container. Closing of the valve of spigot stops the beverage flow. As indicated, when portions of the carbonated beverage are drawn off from the container 12, while the pressure of the carbonating gas in chamber 13 will drop, with a corresponding drop in pressure within receiver 30, atmospheric pressure acting on diaphragm 104 through the breathing chamber 124 actuates the valve device 150 through link 160 to open orifice 158 and hold it open until the pressure levels within the chamber 13 have again built up to a desired carbonating pressure level within the chamber 13, at which point the resulting pressures within the receiver 30 will again deflect the diaphragm 104 upwardly as needed to close the valve device 150 until another portion of the beverage is drawn from the container 12.

It will therefore be seen that the invention provides a beverage carbonating device 10 of simplified construction that is suited for consumer use of the beverage directly from the container 12, either for home generating purposes or fast food facility operating purposes, or the like. The carbonation generating and pressure regulating assembly is operable with either fermentation type or chemical type carbon dioxide generating substances, and keeps such substances fully isolated from the beverage to be consumed. All that reaches the beverage to be consumed is the carbonating carbon dioxide gas, and this is done in a controlled manner to in essence keep the carbonating pressures acting on the beverage at approximately the levels desired for good quality drinking purposes regardless of how much of the beverage may remain in the container. Thus, the last of a particular beverage charge in the container 12 to be withdrawn therefrom will be as of good drinking quality as the first position so withdrawn or any other portions so withdrawn.

Referring now to the device 10A of FIGS. 5–9, the container 12 thereof is shown to be essentially the same structurally as that of device 10; since the device 10A has a major use in connection with merchandising of beer, it is intended that container 12 of device 10A be proportioned to hold the same amount of beer as the conventional one half beer keg (which is fifteen and one half gallons of beer), when device 10A is assembled. Container 12 may alternately be of a configuration resembling the conventional one half beer keg, with the cover 32 being applied to one end of same (not shown).

Referring now to the carbonating gas generating and pressure regulating assembly 26A of device 10A, the receptacle or tank 28A comprises the vessel 27, which has bottom wall 60 that is integral with up-standing circumambient side wall 62 that at the vessel upper end 66 is suitably fixed to receiver or drum 30A, in sealed leak free relation thereto, as by being welded to the drum floor 88, as at 280. The tank 28 at its lower end 68 may be formed with the depending annular flange 70 to serve as a pedestal for the assembly 26A on which it may be rested, as by being placed on table 20 or other suitable support, when container 12 is being loaded or charged with, for instance, beer.

The receiver or drum 30A generally comprises circumambient side wall 82 that in the form illustrated is integral with the receiver floor 88, to which the tank side wall is welded, in the illustrated embodiment. The floor 88 thus spans the vessel top to form tank 28A.

The receiver 30A is otherwise the same as receiver 30 of device 10, as are the diaphragm 104, and the pressure regulating device 34 of device 10, as indicated by corresponding reference numerals.

Cover 32 of device 10A is also substantially the same as cover 32 of device 10, as indicated by corresponding reference numerals. However, as tank 28A is to be charged with carbon dioxide under pressure from a suitable external source of same, tank well 62 has suitably connected to same in leak free relation thereto, as by welding or brazing, a charging conduit 284 that extends from connection to the tank chamber 282, upwardly of assembly 26A and through cover plate member 120 (in suitable sealed leak free relation thereto), to present the upper end 290 in exposed relation, substantially as indicated in FIG. 7. The conduit 284 is shaped so that assembly 26A readily slips into the positioning indicated in FIGS. 5–7 when cover 32 is applied to container 12 in the manner already indicated.

Figure 8:
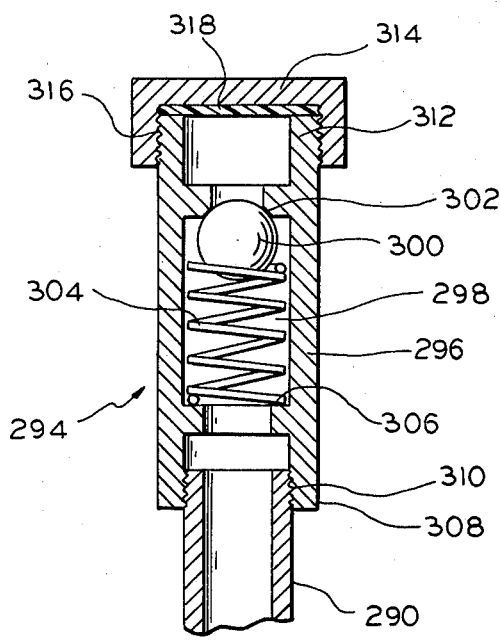
FIGS. 8 and 9 diagrammatically illustrate several check valve arrangements employed in the embodiment of FIGS. 5-7.
Figure 9:
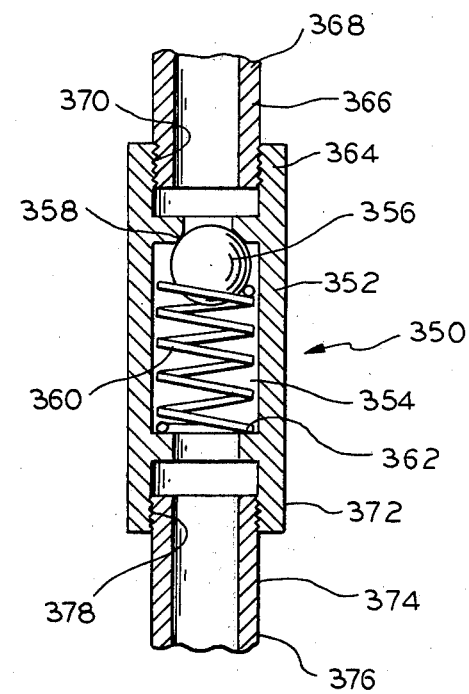

Conduit end 290 has applied thereto a suitable check valve arrangement, such as check valve device 294 of FIG. 8, to retain the charge of tank 28A in the tank for application to the beverage by way of operation of regulating device 34. For purposes of disclosure device 294 is shown as comprising valve body 296 defining valve chamber 298 in which ball type valve member 300 is spring biased against suitable valve seat 302 by compression spring 304 seated in suitable annular spring seat 306. Valve body 296 has its annular end 308 threaded on end 290 of conduit 284 as at 310, while its other annular end 312 threadedly receives suitable closure cap 314, as at 316, that includes suitable resilient seal element 318 for sealing off valve body end 312, as by being turned thereagainst.

While the charging conduit 284 and associated parts are sufficient for most applications, a second conduit 286 may alternately be provided for purging purposes, and that extends from a separate connection to tank chamber 282, upwardly of assembly 26A and through cover plate member 120 (in suitable sealed leak free relation thereto), to present its upper end 292 in exposed relation, substantially as indicated in FIG. 7. The conduits 284 and 286 in such case are shaped so that assembly 26A readily slips into the positioning indicated in FIGS. 5–7 when cover 32 is applied to container 12 in the manner already indicated. Conduit end 292 in such case has applied to same a check valve device 294A that is the same as device 294, to retain the charge of tank 28A in the tank, and yet permit purging of the tank chamber 282 through conduit 286 prior to its charging with carbon dioxide through conduit 294.

Figure 6:
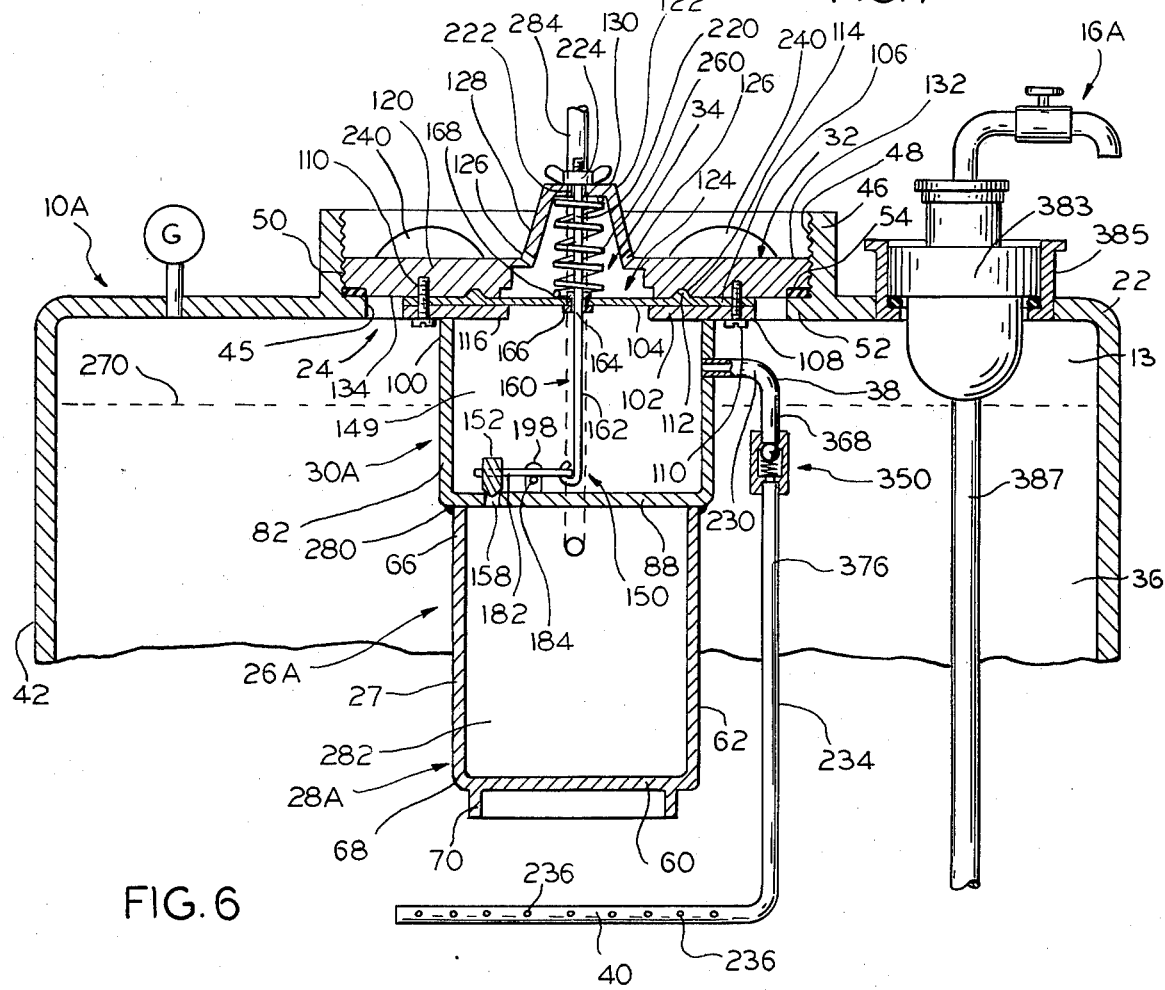

Receiver 30A may include the aforedescribed conduit 38, which in this embodiment may optionally include a suitable check valve arrangement, such as check valve device 350, for preventing back flow of the beverage 36 into receiver 30A. For purposes of disclosure, device 350 (See FIG. 9) is shown as comprising valve body 352 defining valve chamber 354 in which ball type valve member 356 is spring biased against suitable valve seat 358 by compression spring 360 seated on suitable annular spring seat 362. Valve body 352 has its annular end 364 threaded on end 366 of section 368 of conduit 38, as at 370, while its other annular end 372 threadedly receives end 374 of section 376 of conduit 38, as at 378. For purpose of this embodiment, conduit 38 may be employed as indicated in FIGS. 5-7, or alternately section 376 of conduit 38, that is, the portion of conduit 38 upstream of valved device 350, may be omitted. As has also been indicated, check valve device 350 as such as considered an optional feature.

Assembly 26A is assembled in a manner similar to assembly 26, except, of course, vessel 27 is welded to floor 88, and the vessel wall 62 and cover plate 120 are suitably apertured for application thereto at the appropriate time of conduits 294, and 286 (where employed) in suitably sealed relation thereto.

Conventional beer tapping arrangement 16A is only diagrammatically illustrated, but may involve suitable spigot assembly 381 removably applied to a suitable keg fitting 383 suitably applied to the familiar Barnes neck 385 that is affixed, as by employing welding, to container 12. Fitting 383 includes the usual beer dispensing tube 387 that extends into close adjacency with the floor 18 of container 12 and conventional valve assembly (not shown) that seals off fitting 383 when spigot assembly 381 is not applied thereto for beer dispensing purposes, but which is opened when spigot assembly 381 is applied thereto for controlling the dispensing of the beer therethrough in the usual manner, either as shown or at a remote location through a suitable connecting tube. Gauge 250 is positioned as convenient in this embodiment, as indicated in FIGS. 5 and 6.

In use, the assembly 26A is separated from container 12, and container 12 has applied to same beer or some other beverage to be dispensed from device 10A and requiring carbonation and maintenance of same. As device 10A is arranged particularly for use in dispensing beer, it is assumed that beer is applied to container 12 in the usual one half keg amount (15.5 gallons), with the components being proportioned so that when assembly 26A is fully applied to container 12, the beverage level with be approximately as indicated at 270. Either before or after assembly 26A is so applied to container 12, tank 28A is charged with liquid carbon dioxide up to a pressure of approximately four atmospheres so as to have adequate fluid carbon dioxide to carbonate the beer or other beverages 36 contained in chamber 13, appropriately pressurize the beverage to keep it carbonated, until it is fully dispensed from container 12, and dispense same from chamber 13 when spigot 16A is opened.

In effecting such charging of tank 28A, caps 314 are removed from the respective valve devices 294 and 294A, and a suitable source of the liquid carbon dioxide is connected to valve device 294 at its end 312, in any conventional manner, as by employing a suitable applicator to shift the valve member 300 off its seat 302. A similar venting type application is applied to valve device 294A to shift its valve member 300 off its seat 302 (when conduit 292 and valve device 294A are employed), to purge tank chamber 282 through valve device 294A, after which valve member 300 of valve device 294A is released to seat against its seat 302 under the action of spring 304, and tank chamber 282 is fully charged through valve device 294 to the pressure level indicated; where conduit 286 and valve device 294A are not employed, tank 28A is charged with the liquid carbon dioxide in a manner comparable to the charge of air into a tire. In preparation for the charging of tank 28A that is referred to, wing nut 224 is actuated as aforedescribed to set valve member 152 in firm closed relation with orifice open 158.

After charging of tank 28A, the source of the fluid $CO_2$ is disconnected from valve device 294, and the caps 314 are reapplied to their respective valve devices. The assembly 28A is then applied to container 12, in the same manner as applying assembly 28. The wing nut 124 is then turned relative to rod member 162 to shift the rod member 160 downwardly so as to dispose the valve member 152 in its open relation with regard to the orifice 158, and at the position relative to receiver floor 88 that will permit the regulating device 34 to close the valve device 150, when the carbonating pressure in the chamber 13 reaches the desired level as indicated by the gauge 250, to carbon dioxide in gaseous form that is emerging from tank 28A, for carbonating purposes.

With the valve device 150 in its open position, carbon dioxide gas emerging from the liquid $CO_2$ charge of tank 28A passes through orifice 158 into the receiver pressure cavity 149, and as the pressure from the $CO_2$ gas within receiver 30 builds up, the $CO_2$ gas passes from pressure cavity 149 into and through conduit 38 and its valve device 350 for emission into the beverage 36 in carbonating relation thereto. As the pressure of the $CO_2$ gas builds up in cavity 149, valve member 356 of check valve device is unseated to permit the carbon dioxide gas flow into chamber 13. As indicated, when the pressure of the carbonating gas within the container 12, and exteriorly of the assembly 26A, builds up to the desired level as indicated by gauge 250, diaphragm 104 in flexing outwardly of receiver 130 in response to the corresponding pressure levels within the receiver pressure cavity actuates the valve device 150 to close the orifice 158 by seating valve member valve end 154 against valve seat 156. Carbonation of the beverage occurs by way of the carbon dioxide dissolving in the beverage, and carbonation of the beverage is maintained by the pressure conditions maintained in chamber 13. On closing of orifice opening 158, valve member 356 seats against seat 358 of check valve device to prevent back flow of the beverage from chamber 13 into cavity 149, which condition reverses on opening of orifice 158 as device 10A operates.

When beer is to be dispensed from container 12, as at a picnic or the like, a suitable spigot assembly 381 is applied to the container 12, in the usual manner, and when one desires to have a drink of the beverage 36 as carbonated (by device 10A), he suitably actuates the tapping assembly 16A to open same, and the beverage discharges from the spigot assembly 381, under the carbonating pressure in chamber 13, into a suitable container. Closing of the valve of spigot assembly 381 stops the beverage flow. As indicated, as portions of the carbonated beverage are drawn off from the container 12, while the pressure of the carbonating gas in chamber 13 will drop, with a corresponding drop in pressure within receiver 30, atmospheric pressure acting on diaphragm 104 through the breathing chamber 124 actuates the valve device 150 through link 160 to open orifice 158 and hold it open until the pressure levels within the chamber 13 have again built up to a desired carbonating and carbonation maintaining pressure levels within the chamber 13, at which point the resulting pressures within the receiver 30 will again deflect the diaphragm 104 upwardly as needed to close the valve device 150 until another portion of the beverage is drawn from the container 12.

It will therefore be seen that the invention provides a beverage carbonating device 10A of simplified construction that is suited for consumer use of the beverage directly from the container 12, either for home consumption purposes or fast food facility operating purposes, or the like. The carbonation generating and pressure regulating assembly is operable to keep the carbonating pressures acting on the beverage at approximately the levels desired for good quality drinking purposes regardless of how much of the beverage may remain in the container. Thus, the last of a particular beverage charge in the container 12 to be withdrawn therefrom will be as of good drinking quality as the first portion so withdrawn or any other portions so withdrawn.

As indicated, device 10A is particularly useful for carbonating beer and maintaining the carbonation of same. One reason for this is that breweries have available excess carbon dioxide gas that is produced by beer production, and this excess carbon dioxide is available for charging devices 10A, that thus may serve conveniently to provide the consumer with the familiar one half keg quantity of beer. That this excess exists is indicated by the following:

Alcohol in beer is produced by the action of yeast enzymes on sugars, converting the sugars to alcohol and carbon dioxide ($CO_2$). The sugars, usually dextrose and maltose, have been previously produced from the starch in grains by a malting process. The chemical reaction of the yeast on the sugars is:

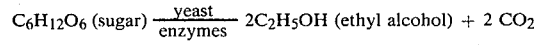

$$C_6H_{12}O_6 \text{ (sugar)} \xrightarrow[\text{enzymes}]{\text{yeast}} 2C_2H_5OH \text{ (ethyl alcohol)} + 2 CO_2$$

1 lb. sugar, molecular wt. 180, yields 0.489 lb. $CO_2$ molecular wt. 44, and 0.511 lb. alcohol, molecular wt. 46.

To produce 15.5 gallons of beer (the standard half keg amount) with 4% alcohol content (by wt.) will evolve 4.9 lb. of $CO_2$.

When beer is conventionally charged into the kegs, it is carbonated with $CO_2$ at approximately 2 atmospheres pressure, requiring about 8.268 cu. ft., about 1.014 lb. Typically, beer is pressured with $CO_2$ at about 2 atm. pressure absolute, approximately 15 lbs. gage for dispensing. This pressure prevents the beer from losing its carbonation as the ullage space increases. To discharge all the beer in a 15.5 gallon keg requires about 4.134 cu. ft. of liquid $CO_2$, or 0.507 lbs. If a 50% extra quantity of liquid $CO_2$ is provided for leakage and a safety factor, then the tank 28A enclosing the charging liquid $CO_2$ would contain approximately 0.7605 lbs. of liquid $CO_2$. It should thus have a liquid capacity of about 21.06 cu. in., plus a gas space above the liquid $CO_2$ of perhaps 10%, making a total volume of 23.16 cu. in.

These figures clearly indicate that the fermentation of beer produces a considerable excess of $CO_2$ than that needed for carbonation of the fermented product and for discharging the beer upon delivery to taverns or bars. Liquid carbon dioxide is preferred for charging tank 28A because of the minimumized space requirements as compared to $CO_2$ gas.

Nevertheless, the beverage employed in device 10A may also be any other beverage of a type requiring carbonation and maintenance of such carbonation until fully dispensed.

While the component parts of the devices 10 and 10A may be made of any suitable materials, stainless steel would be satisfactory for the metallic components involved that will come in contact with the beverage 36 and/or be subject to the pressure levels indicated. While the pressure regulating device 34 is preferred for the illustrated applications, other suitable conventional pressure regulators may be employed to regulate the supply of the fluid $CO_2$ relative to atmospheric pressure. As to device 10A, this may be supplied in other conventional beer dispensing sizes, such as the quarter or one-eighth keg size.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A beverage carbonator device comprising:
   an outer container open at its upper end and defining a beverage carbonation chamber and including means for selectively dispensing a carbonated beverage, when contained therein, therefrom,
   and a carbonating fluid storage and pressure regulating assembly adapted to be mounted in said chamber and comprising:
   a lower vessel that is adapted to receive carbonating fluid,
   an upper carbonating fluid receiver having secured thereto at the lower end thereof said vessel upper end in sealed relation therewith,
   said receiver defining an imperforate floor that spans said vessel upper end and that forms with said vessel a tank for containing the carbonating fluid when received therewith,
   said floor defining an orifice opening to said tank,
   said receiver having an open upper end that is spanned by a flexible diaphragm in sealed relation thereto,
   said receiver defining between said floor and said diaphragm a pressure cavity adapted to receive carbonating fluid from said tank through said orifice opening,
   a cover secured to said receiver upper end in sealed relation to said diaphragm,
   said cover being formed to define with said diaphragm a vented breathing chamber, whereby said diaphragm deflects upwardly of said cavity under the pressure of carbonating fluid received in said pressure cavity,
   a valve member mounted within said receiver for opening and closing said orifice,
   an elongate valve member actuator link secured to said diaphragm and having a depending portion disposed within said cavity,
   means for resiliently biasing said diaphragm inwardly of said cavity and toward said floor against the action of said carbonating fluid in said cavity on said diaphragm, a carbonating fluid conduit connected to said receiver in communication with said pressure cavity at one end thereof and extending exteriorly of said assembly and having the other end of same open to said carbonation chamber for emitting carbonating fluid into said carbonating chamber, means for securing said assembly to said container in sealed relation with said container with said tank disposed in the beverage to be carbonated, means for charging said tank with carbon dioxide under pressure, and means for articulating said link depending portion to said valve member for positioning said valve member relative to said orifice under the control of said diaphragm for maintaining the carbonating fluid in said container at a substantially uniform predetermined pressure.

2. The beverage carbonator set forth in claim 1 wherein:

said actuator link extends through said diaphragm in sealed relation thereto and has an upwardly projecting end portion extending exteriorly of said cover, and means for adjustably securing said link end portion to said cover for holding said valve member seated in sealing relation to said orifice for permitting preliminary build up in said tank of the pressure of the carbonating fluid being charged into said tank.

3. The beverage carbonator set forth in claim 1 wherein:

said means for charging said tank comprises a first charging conduit connected to said tank through said cover, and a second purging conduit connected to said tank through said cover, and check valve means operably connected with the respective first and second conduits for accommodating initial application of the carbon dioxide fluid to said tank through said first conduit with purging of said tank being effected through said second conduit, followed by charging of said tank through said first conduit, and retention of said charge in said tank for supply to said receiver through said orifice.

4. The beverage carbonator set forth in claim 1 wherein:

said other end of said carbonating fluid conduit includes check valve means for precluding reverse fluid flow therethrough.

5. The beverage container set forth in claim 1 wherein said articulating means comprises:

a lever member pivotally mounted in first class lever relation on said receiver floor, and having one end of same operably connected to said valve member and the other end of same operably connected to said link depending portion.

6. In a beverage carbonation maintaining device that comprises a container open at its upper end and defining a beverage carbonation chamber and including means for selectively dispensing a carbonated beverage, when contained therein, therefrom, a carbonating fluid storage and pressure regulating assembly therefor adapted to be mounted in said chamber and comprising:

a lower vessel that is adapted to receive carbonating fluid, an upper carbonating fluid receiver having secured thereto at the lower end thereof said vessel upper end in sealed relation therewith, said receiver defining an imperforate floor that spans said vessel upper end and that forms with said vessel a tank for containing the carbonating fluid when received therein, said floor defining an orifice opening, said receiver having an open upper end that is spanned by a flexible diaphragm in sealed relation thereto, said receiver defining between said floor and said diaphragm a pressure cavity adapted to receive carbonating fluid from said tank through said orifice, a cover secured to said receiver upper end in sealed relation to said diaphragm, said cover being formed to define with said diaphragm a vented breathing chamber, whereby said diaphragm deflects upwardly of said cavity under the pressure of carbonating fluid received in said pressure cavity, a valve member mounted within said receiver for opening and closing said orifice, an elongate valve member actuator link secured to said diaphragm and having a depending portion disposed within said cavity, means for resiliently biasing said diaphragm inwardly of said cavity and toward said floor against the action of the carbonating fluid in said cavity on said diaphragm, a carbonating fluid conduit connected to said receiver in communication with said pressure cavity at one end thereof and extending exteriorly of said assembly and having the other end of same open to said carbonating chamber for emitting carbonating fluid into said carbonating chamber, when said assembly is secured to the container in sealed relation with the container, with said tank disposed in the beverage, means for charging said tank with liquid carbon dioxide under pressure, and means for articulating said link depending portion to said valve member for positioning said valve member relative to said orifice under the control of said diaphragm for maintaining the carbonating fluid in said container at a substantially uniform predetermined pressure.

7. The beverage carbonator set forth in claim 6 wherein:

said actuator link extends through said diaphragm in sealed relation thereto and has an upwardly projecting end portion extending exteriorly of said cover, and means for adjustably securing said link end portion to said cover for holding said valve member seated in sealing relation to said orifice for permitting preliminary build up in said tank of the pressure of the carbonating fluid being charged into said tank.

8. The beverage carbonator set forth in claim 7 wherein:

said end portion of said link extends through said breathing chamber, and wherein said biasing means comprises a helical spring interposed between said diaphragm and said cover in substantial concentric relation to said link.

9. A beverage carbonator device comprising:

an outer container open at its upper end and defining a beverage carbonation chamber and including means for selectively dispensing a carbonated beverage, when contained therein, therefrom, and a carbonating fluid storage and pressure regulating assembly adapted to be mounted in said chamber and comprising:

a lower vessel that is adapted to receive carbonating fluid, an upper carbonating fluid receiver having secured thereto at the lower end thereof said vessel upper end in sealed relation therewith, said receiver defining an imperforate floor that spans said vessel upper end and that forms with said vessel a tank for containing the carbonating fluid when received therein, said floor defining an orifice opening to said tank, said receiver having an open upper end that is spanned by a flexible diaphragm in sealed relation thereto, said receiver defining between said floor and said diaphragm a pressure cavity adapted to receive carbonating fluid from said tank through said orifice opening, a cover secured to said receiver upper end in sealed relation to said diaphragm, said cover being formed to define with said diaphragm a vented breathing chamber, whereby said diaphragm deflects upwardly of said cavity under the pressure of carbonating fluid received in said pressure cavity, a valve member mounted within said receiver for opening and closing said orifice opening, a valve member actuator link linkage secured to said diaphragm and having a portion of same disposed within said cavity, means for resiliently biasing said diaphragm inwardly of said cavity and toward said floor against the action of the carbonating fluid in said cavity on said diaphragm, a carbonating fluid conduit connected to said receiver in communication with said pressure cavity at one end thereof and extending exteriorly of said assembly and having the other end of same open to said carbonation chamber for emitting carbonating fluid into said carbonating chamber, means for securing said assembly to said container in sealed relation with said container with said tank disposed in the beverage to be carbonated, means for charging said tank with carbon dioxide fluid under pressure, and means for regulating said valve member through said linkage for positioning said valve member relative to said orifice opening under the control of said diaphragm for maintaining the carbonating fluid in said container at a substantially uniform predetermined pressure.

10. The beverage carbonator device set forth in claim 9 wherein:

said tank is charged with liquid carbon dioxide.

* * * * *